United States Patent

Behrens et al.

[11] Patent Number: 5,903,857
[45] Date of Patent: May 11, 1999

[54] METHOD AND APPARATUS FOR CALIBRATING AN ANALOG FILTER IN A SAMPLED AMPLITUDE READ CHANNEL

[75] Inventors: Richard T. Behrens, Louisville, Colo.;
Tyson Tuttle, Laguna Beach, Calif.;
Kent D. Anderson, Westminster, Colo.;
Trent O. Dudley, Littleton, Colo.;
William G. Bliss, Thornton, Colo.

[73] Assignee: Cirrus Logic, Inc., Fremont, Calif.

[21] Appl. No.: 08/751,832

[22] Filed: Nov. 18, 1996

[51] Int. Cl.[6] .............................. G06F 17/10; G11B 5/035
[52] U.S. Cl. ...................... 702/190; 702/189; 702/193;
364/724.011; 364/724.2; 360/51; 360/65
[58] Field of Search .................................. 702/107, 189,
702/190, 193; 364/724.011, 825, 724.2;
360/65, 51, 46

[56] References Cited

U.S. PATENT DOCUMENTS

| | | | |
|---|---|---|---|
| 5,258,933 | 11/1993 | Johnson et al. ................... | 364/724.011 |
| 5,281,931 | 1/1994 | Bailey et al. . | |
| 5,327,302 | 7/1994 | Khoury et al. ............................. | 360/65 |
| 5,381,359 | 1/1995 | Abbott et al. . | |
| 5,426,541 | 6/1995 | Coker et al. . | |
| 5,541,520 | 7/1996 | Zai et al. ................................ | 702/190 |
| 5,585,975 | 12/1996 | Bliss ........................................ | 360/65 |
| 5,592,340 | 1/1997 | Minuhin et al. .......................... | 360/65 |
| 5,734,680 | 3/1998 | Moore et al. ........................... | 371/43.6 |

OTHER PUBLICATIONS

U.S. application No. 08/583,295, Armstrong et al., filed Jan. 8, 1996.

*Primary Examiner*—John Barlow
*Assistant Examiner*—Hien Vo
*Attorney, Agent, or Firm*—Howard H. Sheerin; Dan A. Shifrin

[57] ABSTRACT

A method and apparatus for calibrating an analog equalizer in a sampled amplitude read channel is disclosed wherein the filter's frequency response is measured and calibrated directly. This is accomplished by injecting a known periodic signal into the analog filter and measuring a spectrum value at a predetermined frequency. The filter parameters are adjusted accordingly until the spectrum reaches a predetermined target value. In the preferred embodiment, the analog filter comprises at least one second order low pass filter (referred to as a biquad filter), and the filter's spectrum is adjusted relative to the well known parameters $f_o$ and Q. Specifically, the parameters $f_o$ and Q are optimized relative to a power measurement at predetermined harmonics of the input signal. In this manner, the present invention enables auto-calibration of the analog equalizer without reading any data from the disc. Furthermore, the calibration process can be executed during the storage system's normal operation without significantly degrading its overall performance.

25 Claims, 13 Drawing Sheets ary frequencies which are related to the filter's $f_o$ and $Q$ parameters.

METHOD AND APPARATUS FOR CALIBRATING AN ANALOG FILTER IN A SAMPLED AMPLITUDE READ CHANNEL

FIELD OF INVENTION

The present invention relates to the control of disc storage systems for digital computers, particularly to calibrating an analog filter in a sampled amplitude read channel.

BACKGROUND OF THE INVENTION

Sampled amplitude read channels are commonly employed in recording devices, such as optical and magnetic storage systems, for detecting and decoding binary data stored on a disc medium. A transducer (read head), positioned in close proximity to the disc, senses alterations on the disc's surface such as magnetic transitions or optical "pits", which represent the recorded binary data. The surface alterations induce a corresponding change, or pulse, in the analog read signal emanating from the read head. Thus, the read channel must detect and translate these pulses into an estimated binary sequence which, in the absence of errors due to system dynamics, will be the originally recorded binary sequence.

In sampled amplitude read channels, the read signal is equalized into a predetermined partial response (e.g., PR4 or EPR4) meaning that the response of the channel to an isolated surface alteration (i.e., an isolated pulse) will take on a particular shape. The output of the channel can then be approximated as a linear combination of time delayed pulses modulated by the binary input sequence; for example, a binary "1" translates to a positive or negative pulse (alternating) and a binary "0" translates to no pulse.

An important advantage of partial response system is the ability to control and compensate for intersymbol interference (ISI) from neighboring pulses, thereby allowing an increase in recording density without compromising the bit error rate (BER). This intersymbol interference is taken into account when the pulses are detected using a maximum likelihood sequence detector, such as a Viterbi detector, comprised of a state machine, or trellis, "matched" to the particular partial response target. The sequence detection process entails sampling the analog read signal and evaluating the sample values in context. That is, a predetermined number of consecutive input samples are compared to a number of valid binary output sequences, taking into account ISI, and the most likely binary sequence in euclidean space is selected as the correct output sequence. Errors in equalizing the read signal to the desired partial response, however, can cause errors in the detection algorithm (i.e., it can cause the wrong output sequence to be selected) because the sequence detector is no longer "matched" to the channel's response.

Thus, to optimize operation of a sampled amplitude read channel, the filter(s) responsible for equalizing the read signal must be adjusted to an optimal operating setting. This is normally accomplished through some type of "off-line" filter calibration procedure, or through a "real-time" adaptive equalization algorithm, or a combination of both. For example, the filters may first be optimized off line to determine initial optimum settings, and then the filters may be fine tuned in real time during normal operation using, for example, a least mean square (LMS) adaptation algorithm.

The equalization function in a sampled amplitude read channel is typically carried out by a front-end analog filter for equalizing the analog read signal before sampling, and a downstream discrete filter for equalizing the sample values before sequence detection. The analog filter also performs an anti-aliasing function by attenuating noise caused by under sampling the analog read signal.

A prior art method for calibrating the equalizer filters "off line" is to read a test pattern recorded on the disc and compute a mean of squared sample errors (MSE). The test pattern is read several times using a number of different filter settings, and the setting that minimizes MSE is selected as the initial operating point. Thereafter, a real time adaptation algorithm may fine tune the filter settings during normal operation.

There are problems associated with calibrating the equalizer filters not addressed by the prior art. Namely, when a recording system is first powered on after manufacturing, the dynamics of the system are unknown. Consequently, the equalizer filters must be set to "nominal" settings which, hopefully, will allow the read channel to read a test pattern recorded on the disc and execute the filter calibration routines. This "nominal" setting, however, may not be sufficient to enable the read channel to successfully read any data from the disc—thereby disabling the calibration process and the read channel altogether. This undesirable result is more likely to occur due to process variations in the analog components, such as the analog equalizer. That is, the nominal setting for one analog equalizer may be vastly different from that of another. When the process variations are significant, it becomes impracticable to search for an optimal setting by retrying the calibration routine with different filter settings until an operable setting is found.

Furthermore, calibrating the analog equalizer in real time (i.e., with an adaptive algorithm) is typically too complex and expensive to implement. This relegates the analog equalizer to operating settings determined by the off line calibration procedure—where the off line calibration is preformed intermittently (e.g., only at power on) to avoid degrading the storage system's overall performance. Thus, if the system dynamics change during normal operation due, for example, to temperature drift, such changes are not normally accounted for in the analog equalizer.

What is needed, then, is a way to calibrate the analog equalizer in a sampled amplitude read channel without having to rely on "nominal" settings to enable an off line or real time calibration procedure. That is, there is a need to calibrate the analog equalizer without having to read any data from the disc. Further, there is a need for a sampled amplitude read channel capable of calibrating the analog equalizer during normal operation in order to compensate for changes in the system that can occur over time. Still further, there is a need to calibrate the analog equalizer quickly during normal operation to avoid significantly degrading the storage system's overall performance.

SUMMARY OF THE INVENTION

A method and apparatus for calibrating an analog equalizer in a sampled amplitude read channel is disclosed wherein the filter's frequency response is measured and calibrated directly. This is accomplished by injecting a known periodic signal into the analog filter and measuring a spectrum value at a predetermined frequency. The filter parameters are adjusted accordingly until the spectrum reaches a predetermined target value. In the preferred embodiment, the analog filter comprises at least one second order low pass filter (referred to as a biquad filter), and the filter's spectrum is adjusted relative to the well known parameters $f_o$ and $Q$. Specifically, the parameters $f_o$ and $Q$ are optimized relative to a power measurement at predetermined harmonics of the input signal. In this manner, the present invention enables auto-calibration of the analog equalizer without reading any data from the disc. Furthermore, the calibration process can be executed during the storage system's normal operation without significantly degrading its overall performance.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

Figure 1A:
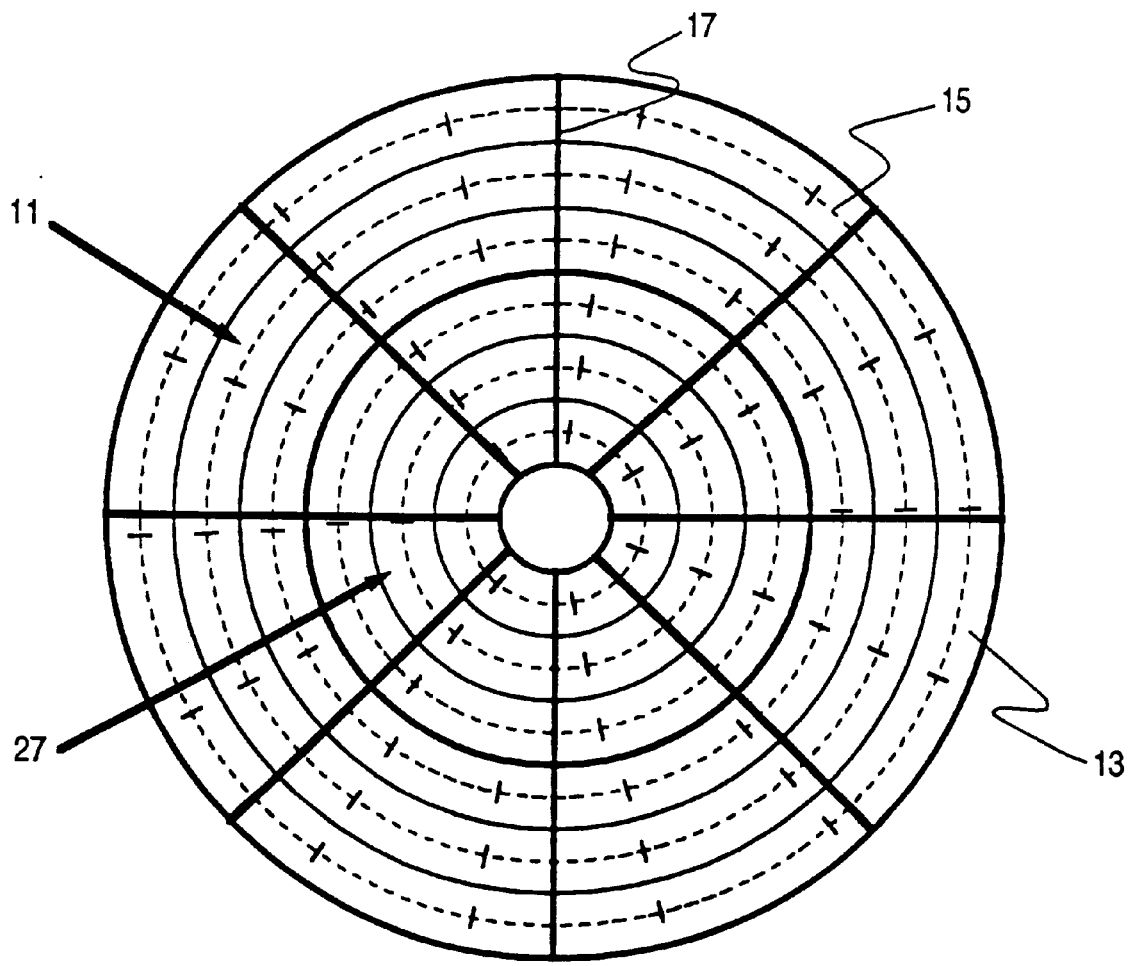
FIG. 1A shows an exemplary data format of a magnetic disc having a plurality of concentric tracks comprised of a plurality of user data sectors and embedded servo data wedges.

For illustration purposes, FIG. 1A shows an exemplary data format of a magnetic media comprising a series of concentric data tracks 13 wherein each data track 13 comprises a plurality of sectors 15 with embedded servo wedges 17. A servo controller (not shown) processes the servo data in the servo wedges 17 and, in response thereto, positions a read/write head over a desired track. Additionally, the servo controller processes servo bursts within the servo wedges 17 to keep the head aligned over a centerline of the desired track while writing and reading data. The servo wedges 17 may be detected by a simple discrete time pulse detector or by a discrete time sequence detector. The format of the servo wedges 17 includes a preamble and a sync mark, similar to the user data sectors 15.

Figure 1B:
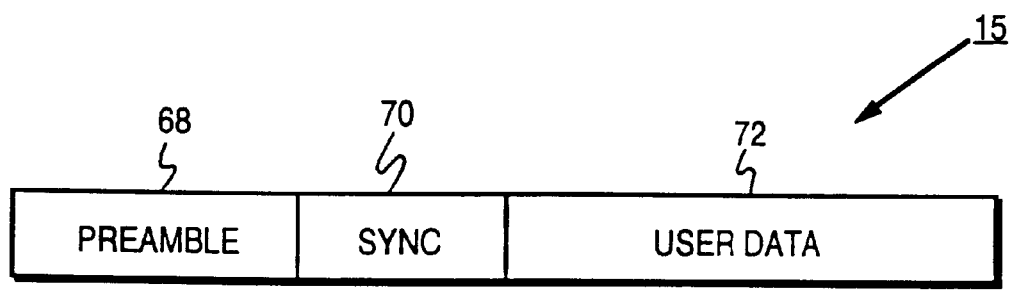
FIG. 1B shows an exemplary format of a user data sector.

FIG. 1B shows the format of a user data sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72.

The storage capacity at the outer tracks can be increased due to the increase in circumferential recording area (i.e. due to the decrease in ISI). Accordingly, the disc shown in FIG. 1A is partitioned into an outer zone 11 comprising fourteen data sectors per track, and an inner zone 27 comprising seven data sectors per track. In practice, the disc is actually partitioned into several zones, wherein the capacity and data rate increases from the inner to outer zones.

As will become more apparent in the following description, the calibration process of the present invention determines optimum operating settings for the analog equalizer for each of the data zones, as well as for the servo wedges. In other words, the analog equalizer is calibrated to account for the system dynamics encountered across the radius of the disc (including the change in data rate) as well as dynamics associated with reading the servo wedges. These calibration settings are then stored in non-volatile memory (for example, on the disc) and later used during normal operation to reconfigure the analog equalizer when the read head transitions into a new zone or into a servo wedge.

Conventional Sampled Amplitude Read Channel

Figure 2:
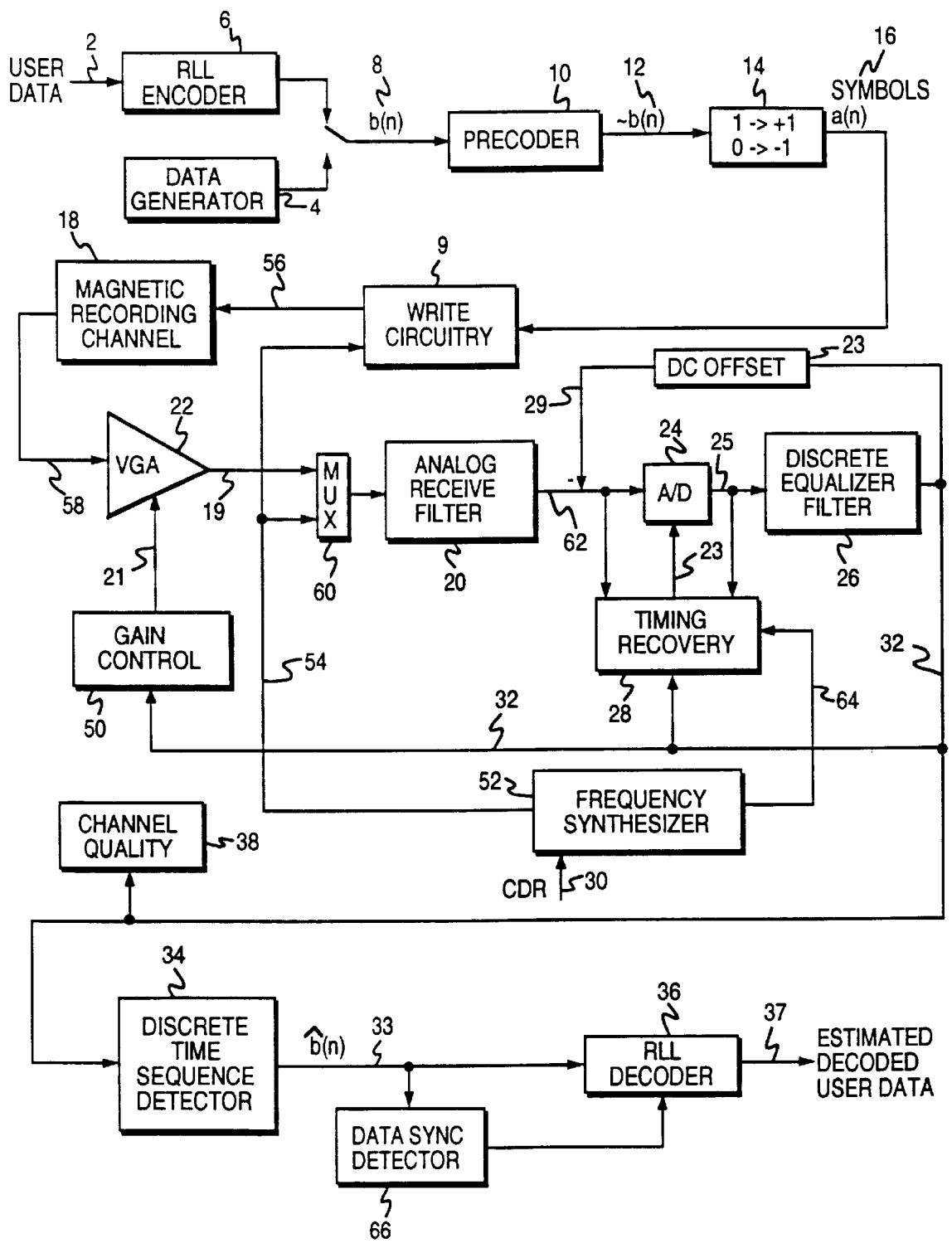
FIG. 2 is a block diagram of a conventional sampled amplitude read channel employing a channel quality circuit which calibrates the analog equalizer by reading a test pattern from the disc and minimizing a mean squared error measurement.

Referring now to FIG. 2, shown is a detailed block diagram of a conventional sampled amplitude read channel. During a write operation, preamble data and a sync mark from a data generator 4 (for example 2T preamble data) are written onto the media preceding the user data. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire an acquisition preamble 68 recorded on the disc preceding the recorded user data 72 as shown in FIG. 1B. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1:

TABLE 1

| Channel | Transfer Function | Dipulse Response |
| --- | --- | --- |
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

A DC offset circuit 23, responsive to the equalized sample values 32, computes and subtracts the DC offset 29 from the analog read signal 62.

The discrete equalizer filter 26 may be implemented as a real-time adaptive filter which compensates for parameter variations over the disc radius (i.e., zones), disc angle, and environmental conditions such as temperature drift.

After equalization, the equalized sample values 32 are applied to a decision directed gain control 50 and timing recovery 28 circuit for adjusting the amplitude of the read signal 58 and the frequency and phase of the sampling device 24, respectively. Gain control 50 adjusts the gain of variable gain amplifier 22 over line 21 in order to match the magnitude of the channel's frequency response to the desired partial response, and timing recovery 28 adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations.

The equalized samples 32 are input into a discrete time sequence detector 34, such as a maximum likelihood (ML) Viterbi sequence detector, which detects an estimated binary sequence b̂(n) 33 from the sample values. An RLL decoder 36 decodes the estimated binary sequence b̂(n) 33 from the sequence detector 34 into estimated user data 37. A data sync detector 66 detects a sync mark 70 (shown in FIG. 1B) in the data sector 15 in order to frame operation of the RLL decoder 36. In the absence of errors, the estimated binary sequence b̂(n) 33 matches the recorded binary sequence b(n) 8, and the decoded user data 37 matches the recorded user data 2.

As described in the background section, the components of the read channel must be calibrated in order to achieve optimum performance. To this end, conventional calibration techniques include writing a test pattern to the disc and, upon read back, using a channel quality circuit 38 to compute sample errors as a function of the current component settings (where sample errors are computed as the difference between the actual sample values and estimated or ideal sample values). The test pattern is read several times with varying component parameters and a resulting mean squared error (MSE) measurement taken. In this manner, the components can be programmed with the settings that minimize the mean squared error, thereby calibrating the read channel to optimize performance.

As mentioned above, the problem with this "off line" calibration technique is that it requires a priori knowledge of "nominal" component parameters so as to enable the read channel to read the test pattern initially. That is, if the initial component settings are grossly incorrect, the calibration process is rendered useless because the read channel will be unable to read the test pattern. This problem is exacerbated by process variations in the analog components, such as the analog equalizer. Further, calibrating the channel components by reading a test pattern and minimizing MSE effectively prohibits "on line" calibration because it is too time consuming. Thus, variations in system dynamics due, for example, to temperature drift are not normally accounted for.

Hardware Configuration

In the present invention, the analog equalizer is preferably implemented as two cascaded low pass biquad filters, where the transfer function of a single low pass biquad is represented as, $$H(s) = \frac{\omega_s^2}{s^2 + \frac{\omega_o}{Q}s + \omega_o^2}.$$

Figure 3:
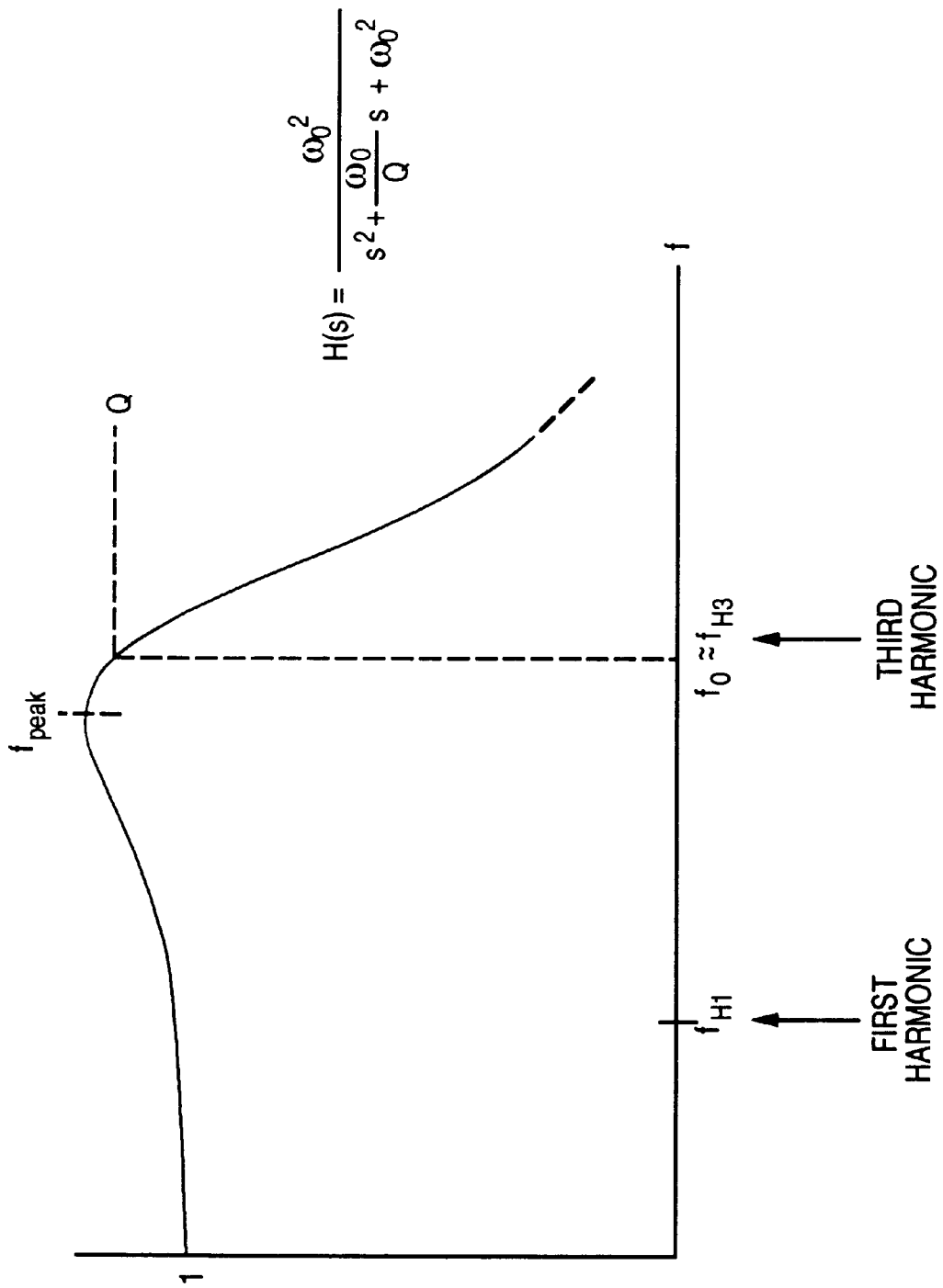
FIG. 3 shows the magnitude response of a biquad filter illustrating the relationship of the well known spectrum parameters $f_o$ and Q.

As can be seen from FIG. 3, $\omega_o$ (or $f_o$ in Hz) corresponds approximately to the frequency of peak magnitude when Q is high, and Q corresponds to the actual magnitude at $f_o$ relative to the DC gain. The parameters $f_o$ and Q in the above biquad transfer function are well known and commonly used to specify the desired shape of the resulting spectrum. For example, in a sampled amplitude read channel for magnetic disc recording employing two cascaded low pass biquad filters, the desired $f_o$ and Q settings for each filter are typically in the ranges:

$f_o$=25% to 40% of the sampling frequency (data rate); and
Q=1 to 2.

Figure 4:
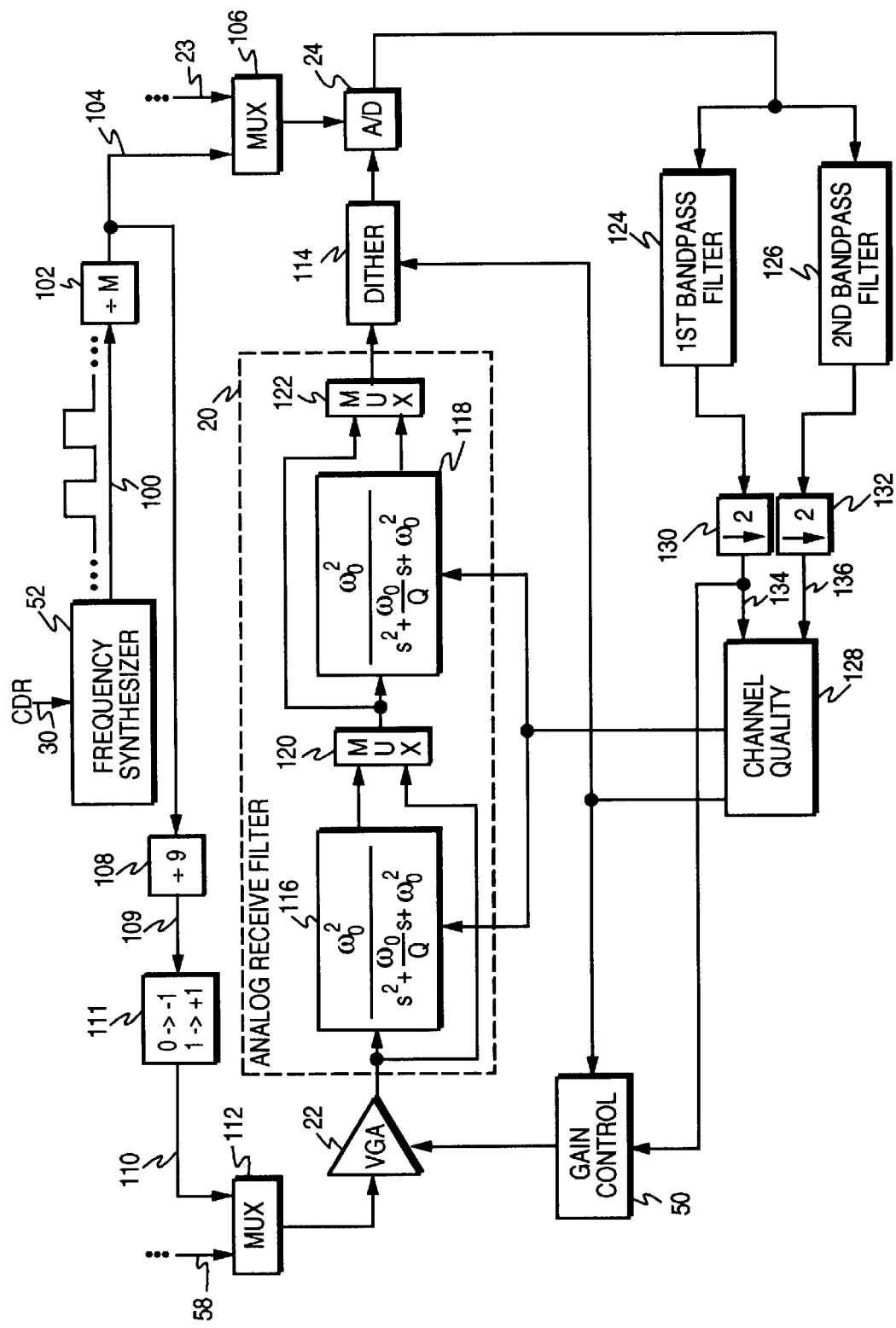
FIG. 4 shows details of the present invention including a frequency synthesizer for generating a periodic input signal and a sampling signal, an analog equalizer comprising two low pass biquad filters, two bandpass filters for extracting the first and third harmonics of the input signal, and a channel quality circuit for measuring the power at the first and third harmonics.

A block diagram of the circuitry required to calibrate the analog equalizer according to the present invention is shown in FIG. 4. The frequency synthesizer 52 of FIG. 2 generates a square wave at a base frequency 100 which is divided by a predetermined integer M 102 to generate a sampling frequency 104 applied to the A/D 24 through multiplexer 106. In the preferred embodiment, M is set to 2 when calibrating at the user data rate, and M is set to 3 or 4 when calibrating at the servo data rate. As described above, the channel data rate (CDR) signal 30 sets the base frequency 100 of frequency synthesizer 52 according to the user data rate of a selected zone or to the servo data rate. The sampling frequency 104 is divided by 9 108 and the output 109 modulated 111 to generate a periodic input signal 110 applied to the input of the variable gain amplifier (VGA) 22 through multiplexer 112. In this manner, the periodic input signal 110 is sampled synchronously (9 samples per period) at some arbitrary constant phase.

The selection of the periodic input signal and the sampling frequency is somewhat arbitrary; however, a square wave with a 50% duty cycle oversampled at 9 times the frequency of the square wave simplifies certain aspects of the present invention. A more detailed description of the implementation and advantages derived from these design considerations is provided below with reference to the divide by 9 circuit 108 and the bandpass filters for extracting the first and third harmonics of the square wave input signal shown in FIGS. 7A–9B.

Nine sample phases is inadequate to sufficiently average out quantization and differential non-linear noise associated with the A/D 24. To compensate for this effect, the input signal is amplitude dithered 114 using the DAC in the offset loop 23 of FIG. 2. Preferably, the dither signal is a small amplitude triangle wave added to the input signal, together with the DC offset value 29. It is not difficult to arrange for the dither signal to be orthogonal to the sampled input signal so that the dither does not perturb the energy measurement. This allows the dither energy to be subtracted out of the power measurements if deemed necessary.

The periodic signal (square wave) is input into the analog receive filter 20 which comprises a first biquad filter 116 and a second biquad filter 118 connected in series. Each biquad filter is calibrated separately; multiplexors 120 and 122 are configured such that one or the other biquad filter is in the signal path during calibration. The filtered signal is amplitude dithered 114 and then sampled by A/D 24. The sampled signal is filtered by a first bandpass filter 124 and by a second bandpass filter 126. The first bandpass filter 124 extracts the fundamental (or first) harmonic of the periodic input signal 110, and the second bandpass filter 126 extracts the third harmonic of the input signal 110. As is described in greater detail below, the first and third harmonics of the input signal are used to calibrate the $f_o$ and Q parameters of the low pass biquad filters.

In the preferred embodiment, the first bandpass filter 124 is implemented using the discrete time equalizer 26 of FIG. 2. That is, the coefficients of the discrete equalizer filter 26 are programmed to pass the fundamental harmonic of the periodic input signal 110. The second bandpass filter 126 can be implemented as an additional discrete time filter, or if the read channel employs interpolated timing recovery, it can be implemented using the discrete time interpolation filter. More details of the bandpass filters are provided below with reference to FIGS. 9A and 9B.

The channel quality circuit 128 of FIG. 4, which is described below with reference to FIG. 5, operates simultaneously on the even and odd subsequences of the sampled signal in order to reduce the clocking speed of the digital circuitry. Thus, the outputs of the bandpass filters 124 and 126 are decimated by 2 using decimation circuits 130 and 132 to generate an even 134 and odd 136 subsequence input into the channel quality circuit 128. Note, however, that decimating the sampled sequence is not a necessary or a limiting aspect of the present invention; decimating merely simplifies the implementation without significantly compromising performance. The channel quality circuit 128 executes the calibration procedure of the present invention described below with reference to FIGS. 6A–6D.

During the calibration process, various signals are generated to activate/deactivate the VGA 22 and the dither 114, and to program the biquad filter parameters fo and Q. Before calibrating the analog equalizer, the gain control 50 and offset loop 23 of FIG. 2 are initialized to nominal operating settings. This is accomplished by disabling the dither 114 and performing a preliminary "read" of the periodic input signal while adjusting the VGA 22 and DC offset 29 to appropriate values. The gain control 50 operates on the decimated sample sequence 134 output of the first bandpass filter 124, and the DC offset loop 23 operates on the A/D output sample sequence 25. Thereafter, the channel quality circuit 128 disables (freezes) the gain control 50 and offset loop 23, enables the dither 114, and performs the calibration procedure set forth below.

Figure 5:
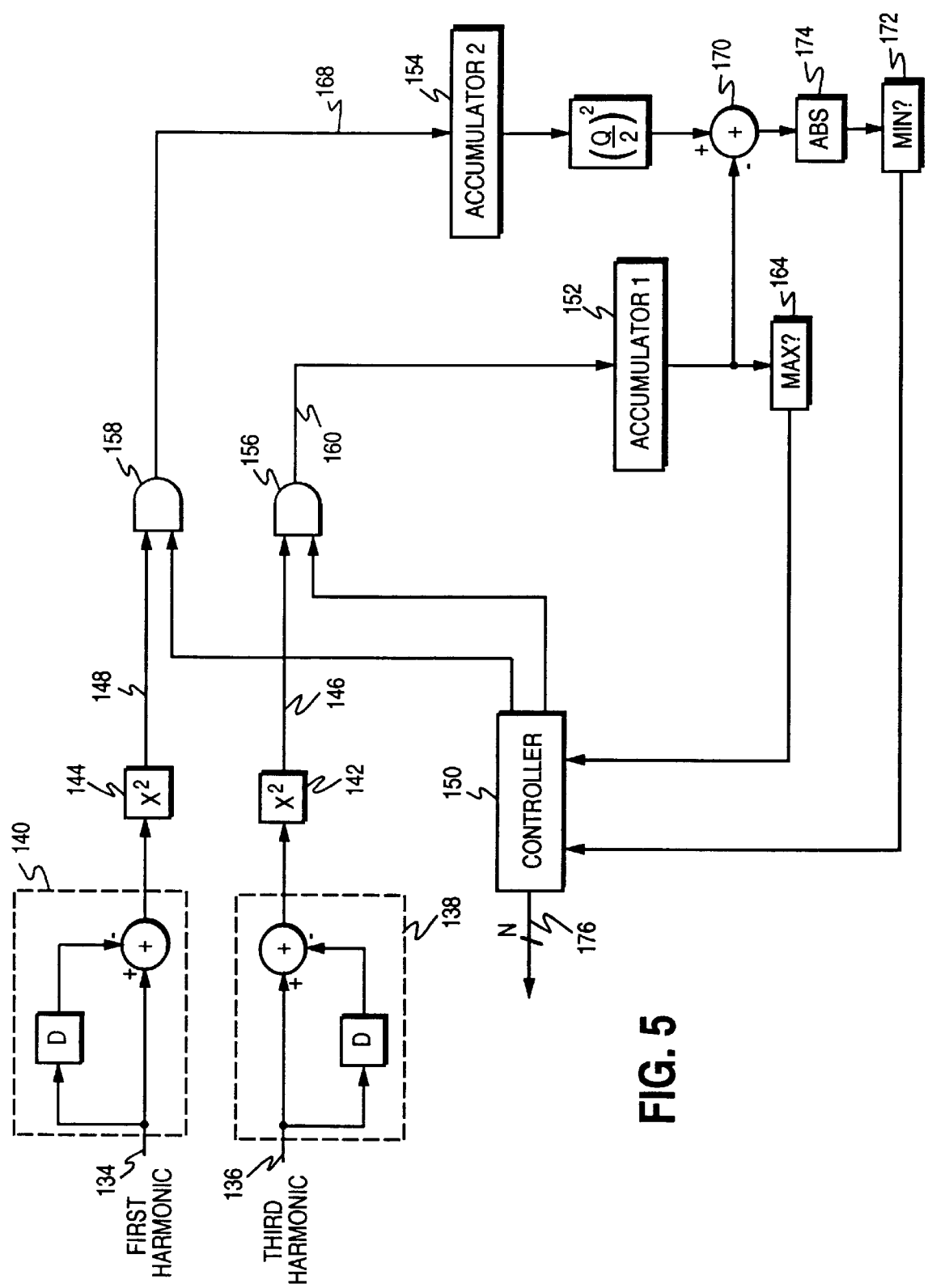
FIG. 5 shows details of the channel quality circuit of FIG. 4, including circuitry for measuring the power at the first and third harmonics of the input signal.

Referring now to FIG. 5, the channel quality circuit 128 receives the subsequences 134 and 136 representing the first and third harmonics of the periodic input signal, and filters each with a 1-D filter 138 and 140. The 1-D filters assist in shaping the spectrum of the first and second bandpass filters 124 and 126 of FIG. 4 as described in more detail below with reference to FIG. 9A and 9B. Squarer circuits 144 and 142 square the outputs of the 1-D filters, and the squared signals 148 and 146 are accumulated to compute the powers of the first and third harmonics. Accumulating the power signals is carried out by a controller 150 which is responsible for executing the calibration procedure set forth below.

For each parameter setting of $f_o$ and Q, the controller 150 is configured to accumulate a predetermined number of squared sample values in accumulators 152 and 154, respectively. Preferably, the controller 150 is configured to accumulate 666 samples which is the least common multiple of the signal period (9) and the triangle wave dither period (preferably 74); that is, a full period of the signal-plus-dither sequence is accumulated each time a power measurement is taken. After decimation 130 and 132, the period of the each harmonic signal 134 and 136 is 333 samples.

To facilitate accumulating the desired number of samples, the squared sample signals 146 and 148 are enabled by the controller 150 through AND gates 156 and 158 in order to accumulate 333 samples for each harmonic. When calibrating the $f_o$ parameter, the squared samples of the third harmonic 160 are accumulated 152. As described in greater detail below with reference to FIGS. 6A–6D, when calibrating the fo parameter a search is performed to find the $f_o$ setting that generates the maximum power measurement. Thus, for each tested setting of $f_o$ the power measurement is compared to the current maximum 164 and, if greater, the current setting is saved by the controller 150. After searching the parameter space for $f_o$, the setting corresponding to the maximum power measurement is used as the operating setting.

When calibrating the Q parameter, the squared samples of the first harmonic 168 are accumulated 154 and then scaled by $(Q/2)^2$ (the reason for scaling is explained in greater detail below). The squared samples of the third harmonic 160 are also accumulated 152, and a difference between the accumulated values is computed at adder 170. When calibrating the Q parameter, a search is performed to find the Q setting that generates the minimum 172 of the absolute value 174 of the difference between the accumulated power measurements at the first and third harmonics. The Q setting corresponding to the minimum absolute difference is saved by the controller 150 and used as the operating setting.

The controller 150 programs the $f_o$ and Q parameters over lines 176 for each power measurement taken. Additionally, the controller 150 configures the gain control 50 and the dither circuit 114 shown in FIG. 4 as described in the following section with reference to FIGS. 6A–6D.

Calibration Procedure

A flow chart of the calibration procedure according to the present invention is shown in FIGS. 6A–6D. Starting with FIG. 6A, the controller 150 of FIG. 5 configures 200 the multiplexers 120 and 122 of FIG. 4 to insert the first biquad filter 116 into the signal path. The controller 150 also configures 202 multiplexer 112 to select the square wave 110 generated by the frequency synthesizer 52 as the input to the VGA 22. It then sets Q to its minimum setting and $f_o$ to its maximum setting 204. Thereafter, the dither 114 of FIG. 4 is disabled 206, the VGA 22 is auto-zeroed 208, and 666 samples are "read" while adjusting the gain and DC offset to appropriate values 210. Then, the gain and offset loops are disabled (frozen) 212 during the remainder of the calibration procedure, and the dither circuit 114 is activated 214. After executing the initialization steps of FIG. 6A, the $f_o$ parameter of the biquad filter 116 is calibrated. Each biquad filter comprises a capacitor control for setting a coarse $f_o$ range and a fine $f_o$ range (which is merely a matter of auto-calibration convenience, not an inherent limitation of the biquad filter). The relationship between $f_{peak}$, $f_o$ and Q is, $$f_{peak} = f_o \sqrt{1 - \frac{1}{2Q^2}}$$

so as Q tends to infinity, fpeak tends toward $f_o$. This relationship is reflected in FIG. 3. Thus, to calibrate the fo parameter, Q is set to its highest value (preferably around 2.4) and a search is carried out to find the setting which generates the maximum power measurement at the third harmonic of the input square wave. That is, a power measurement is taken over a range of $f_o$ parameter values to find the setting that generates the maximum power measurement. The setting that generates the maximum power measurement corresponds to $f_{peak}$ which is approximately $f_o$ when Q is high.

Figure 6A:
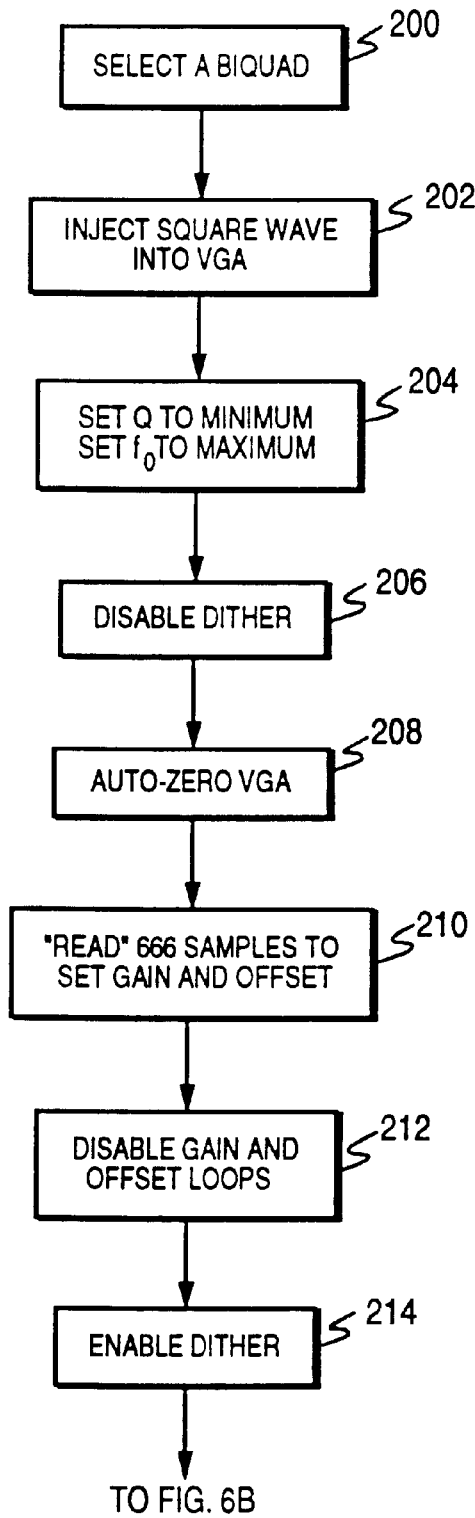
FIG. 6A–6D show a flow chart description of the analog equalizer calibration procedure of the present invention.
Figure 6B:
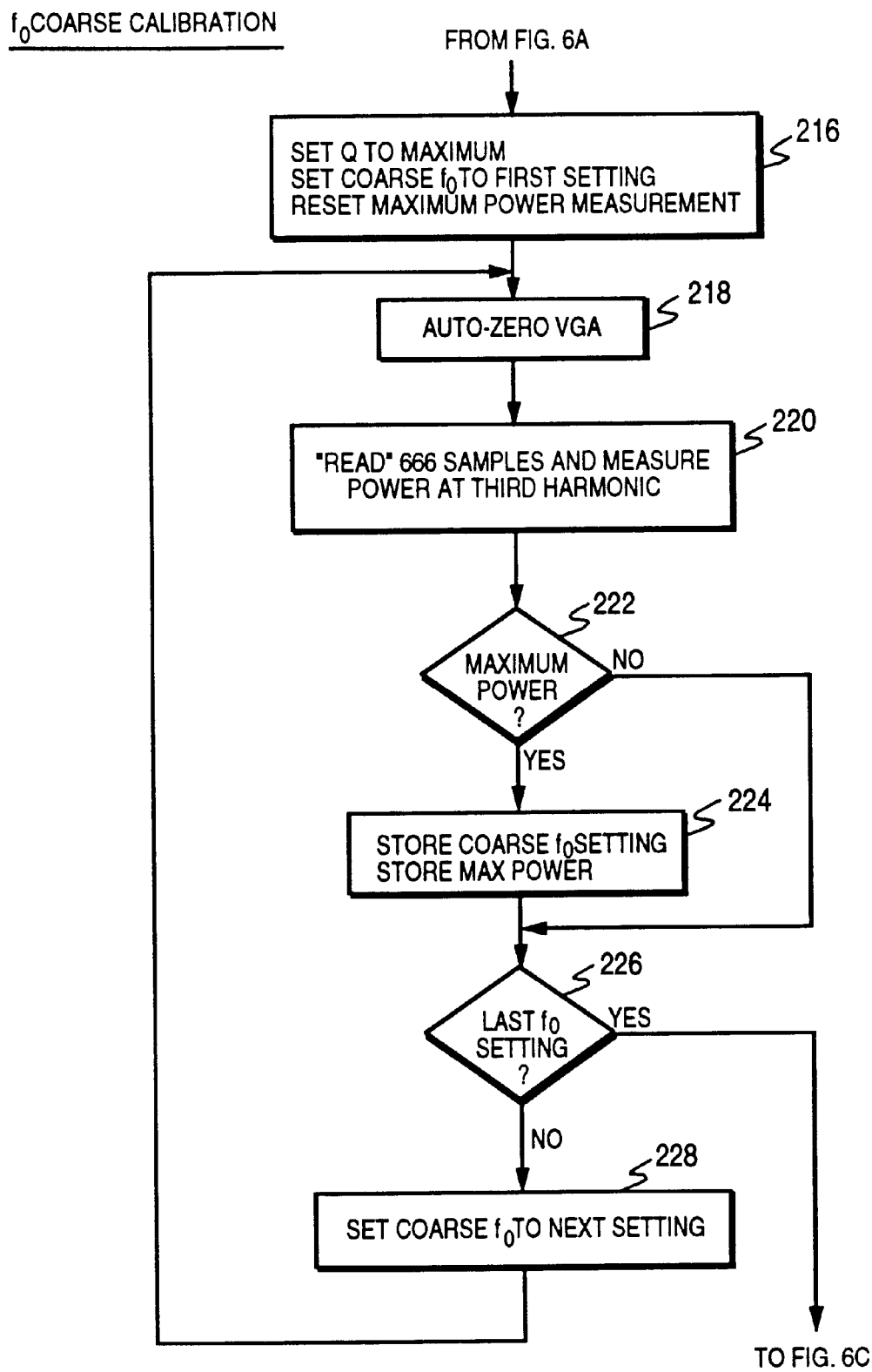

Continuing now to FIG. 6B which shows the calibration flow chart for the coarse setting of $f_o$, first the Q parameter is programmed to its highest setting, the coarse $f_o$ parameter is set to the first value in the search range, and the maximum power measurement is reset to zero 216. Then the VGA is auto-zeroed 218 and 666 samples are "read" to take a power measurement at the third harmonic 220. The measured power is compared to the current maximum 222 and, if greater, the current coarse $f_o$ setting and the power measurement are saved 224. This process is repeated with the next coarse $f_o$ setting 228 until a power measurement has been taken for each setting in the search range.

Figure 6C:
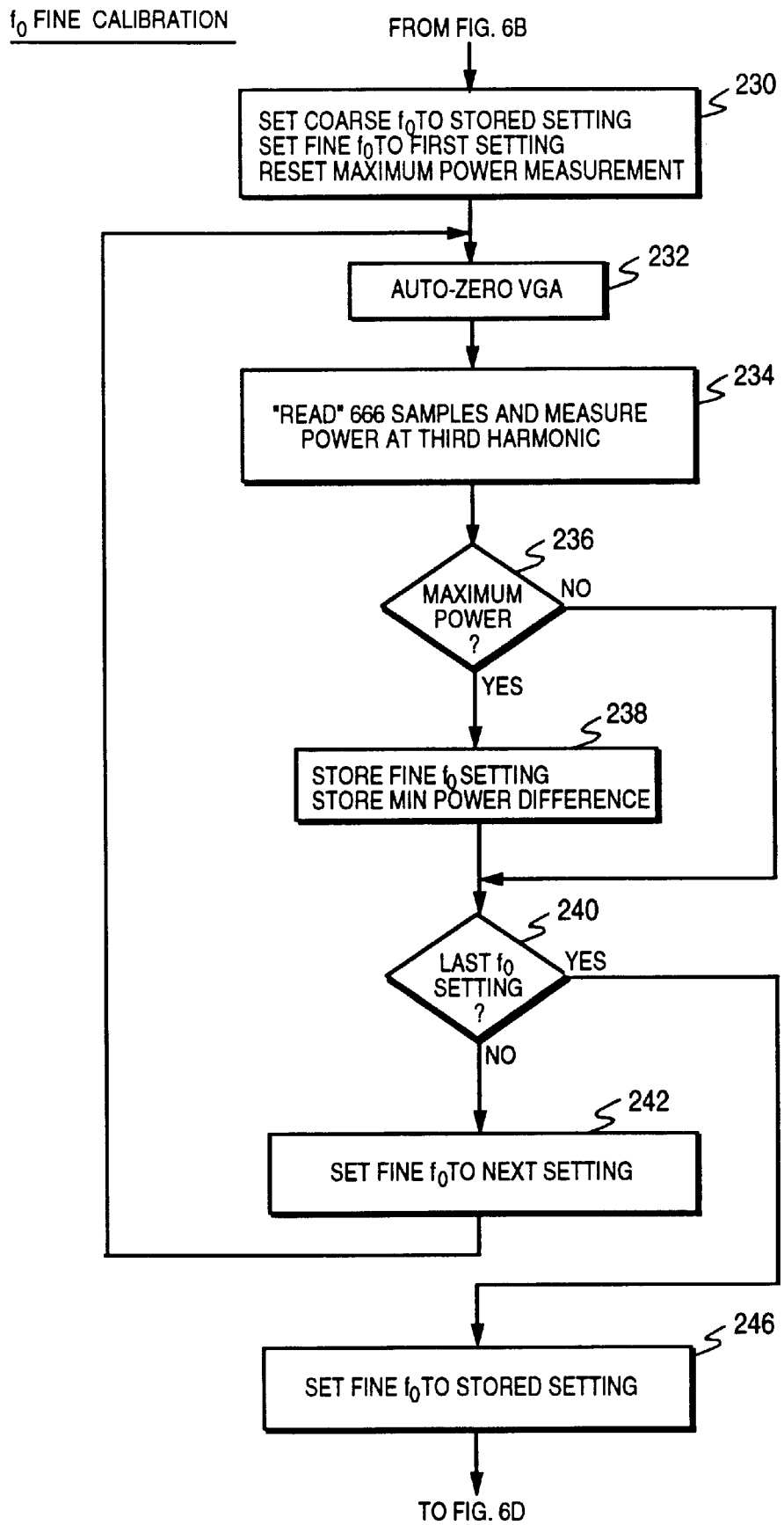

After taking a power measurement for the last coarse $f_o$ setting 226, the fine $f_o$ setting is calibrated according to the flow chart of FIG. 6C. With the Q setting still at its highest value, the coarse $f_o$ parameter is set to the value found above (i.e., to the value that generated the maximum power measurement), the fine $f_o$ parameter is set to the first value in the search range, and the maximum power measurement is reset to zero 230. Then the VGA is auto-zeroed 232, and 666 samples are "read" to take a power measurement at the third harmonic 234. The measured power is compared to the current maximum 236 and, if greater, the current fine $f_o$ setting and power measurement are saved 238. This process is repeated with the next fine $f_o$ setting 242 until a power measurement has been taken for each setting in the search range. After taking a power measurement for the last setting 240, the fine $f_o$ parameter is set 246 to the value stored at step 238 (i.e., to the value that generated the maximum power measurement).

After calibrating the $f_o$ parameter the Q parameter is calibrated to achieve the following relationship, $$P_{f1} \cdot G^2 LPF_{f1} \cdot G^2 Bp1_{f1} \cdot M = P_{f3} \cdot G^2 LPF_{f3} \cdot G^2 BP3_{f3} \quad (1)$$

where $P_{f1}$ and $P_{f3}$ are the powers of the input square wave at the first and third harmonic, $G^2 LPF_{f1}$ and $G^2 LPF_{f3}$ are the power gains of the low pass biquad filter at the first and third harmonic, $G^2 Bp1_{f1}$ and $G^2 BP3_{f3}$ are the power gains of the first and second bandpass filters at the first and third harmonic, and M is a predetermined scaling factor relative to Q. With the periodic input signal configured as a square wave having a 50% duty cycle, the relationship between the powers of the first and third harmonics of the square wave is $$P_{f3} \approx (1/3)^2 P_{f1}.$$

The relationship of Q to the power of the low pass biquad filter is also known, $$Q \approx GLPF_{f3}/GLPF1_{f1}$$

since $GLPF_{f1}$ is approximately the gain at DC. The gain of the first and second bandpass filters ($GBP1_{f1}$ and $GBP3_{f3}$) are selected such that when M=1, Q=2 for equation (1) above to be true. Then the appropriate scaling factor M relative to Q can be determined by setting $GLPF_{f1}=1$ so that $GLPF_{f3}=Q$, and solving for M in equation (1) in terms of Q (i.e., $M=(Q/2)^2$).

From equation (1), the Q parameter of the low pass biquad filter is calibrated by measuring, at the output of the biquad filter, the power of the first harmonic scaled by M and the power of the third harmonic. When the ratio between these two powers is unity, the difference between them is zero and equation (1) is satisfied. Thus, the minimum difference between the power measurements is selected as the operating point for the desired Q parameter.

Similar to the fo parameter, the optimal filter setting for the desired Q parameter is determined by performing a search over a range of Q settings and selecting the setting that results in the minimum power difference at the frequencies corresponding to the first and third harmonics of the square wave input signal. To simplify the multiply operation of the scaling factor M in equation (1), Q is limited to the values $\{1, \sqrt{3}, \text{and } 2\}$ resulting in multiplier choices for $M=(Q/2)^2$ of $\{1/4, 3/4, \text{and } 4/4\}$.

Figure 6D:
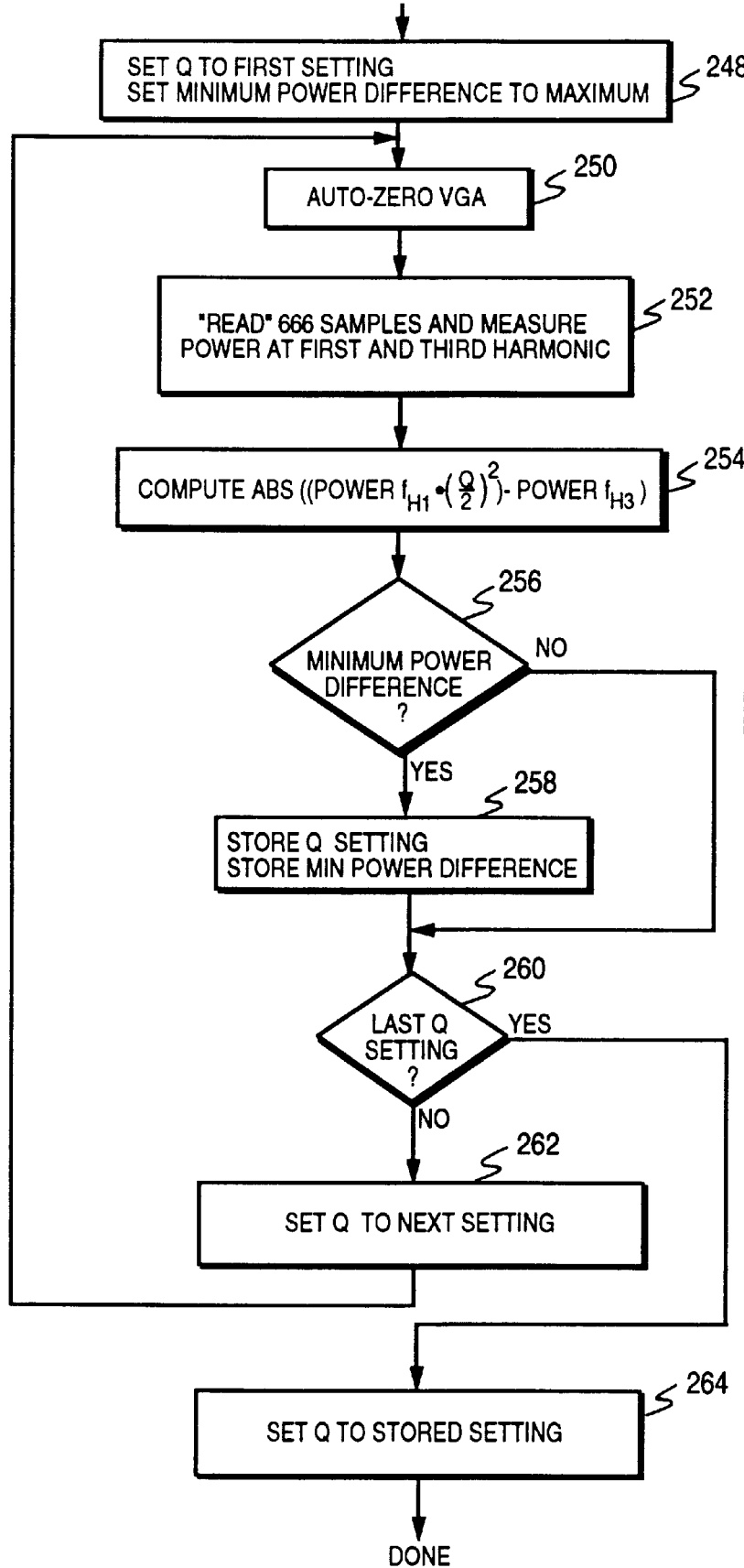

The calibration steps for calibrating the Q parameter are shown in the flow chart of FIG. 6D. With the coarse and fine $f_o$ parameters set to the calibrated values determined above, the Q setting is set to the first value in the search range and the minimum power difference is set to its maximum 248. Then the VGA is auto-zeroed 250 and 666 samples are "read" to take a power measurement at the first and third harmonics 252. The absolute value of the difference between the power measurement at the first harmonic scaled by $(Q/2)^2$ and the third harmonic is computed 254. The current difference is compared to the minimum difference 256 and, if smaller, the current Q setting and power difference measurement are saved 258. This process is repeated with the next Q setting 262 until a power difference measurement has been taken for each setting in the search range. After taking a power difference measurement for the last setting 260, the Q parameter is set 264 to the value stored at step 258 (i.e., to the value that generated the minimum power difference measurement).

When finished calibrating the fo and Q parameters for the first biquad filter 116 of FIG. 4, the controller 150 of FIG. 5 configures the multiplexers 120 and 122 to place the second biquad filter 118 in the signal path so that its fo and Q parameters can be calibrated in the same manner (i.e., by executing the flowcharts of FIGS. 6A–6D). Once both biquad filters have been calibrated according to the present invention, the controller 150 configures the read channel for normal operation by selecting the disc read signal 58 through multiplexer 112 as the input to the VGA 22, and by selecting the timing recovery signal 23 through multiplexer 106 as the sampling signal to the A/D 24. Thereafter, the controller may execute the above described prior art calibration procedure by reading a test pattern and minimizing MSE to further calibrate the analog equalizer and to calibrate the other components in the read channel.

It should be apparent that the technique of the present invention for calibrating the analog equalizer does not require reading any data from the disc. As such, the analog equalizer can be calibrated even if there are significant variations in the IC fabrication process. Further, the present invention calibration technique can be performed during normal operation of the disc storage system (e.g., while the read/write head is seeking to a selected track) in order to compensate for parameter variations that occur over time due, for example, to temperature drift. To minimize the calibration time when calibrating the analog equalizer "on line", the search range of the $f_o$ and Q parameters may be reduced.

Bandpass Filters

The selection for the periodic input signal and the sampling period is somewhat arbitrary; however, the selection of a square wave having a 50% duty cycle and sampled at 9 times the fundamental frequency simplifies certain aspects of the present invention. Before describing why a square wave with a 50% duty cycle is the preferred embodiment, first a circuit for generating this signal is described.

Figure 7A:
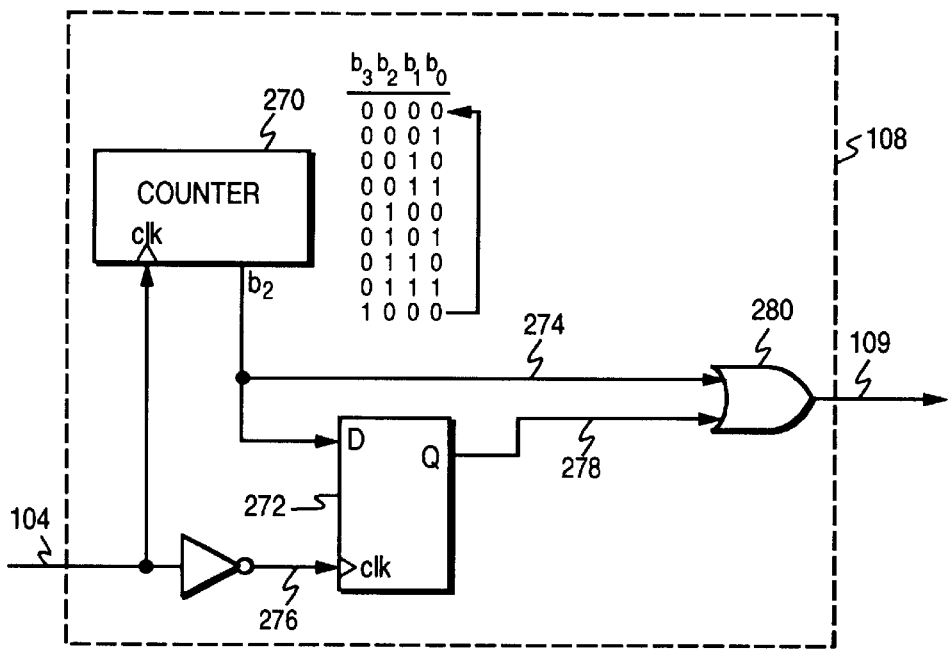
FIG. 7A and 7B show implementation details for generating the periodic input signal (square wave).
Figure 7B:
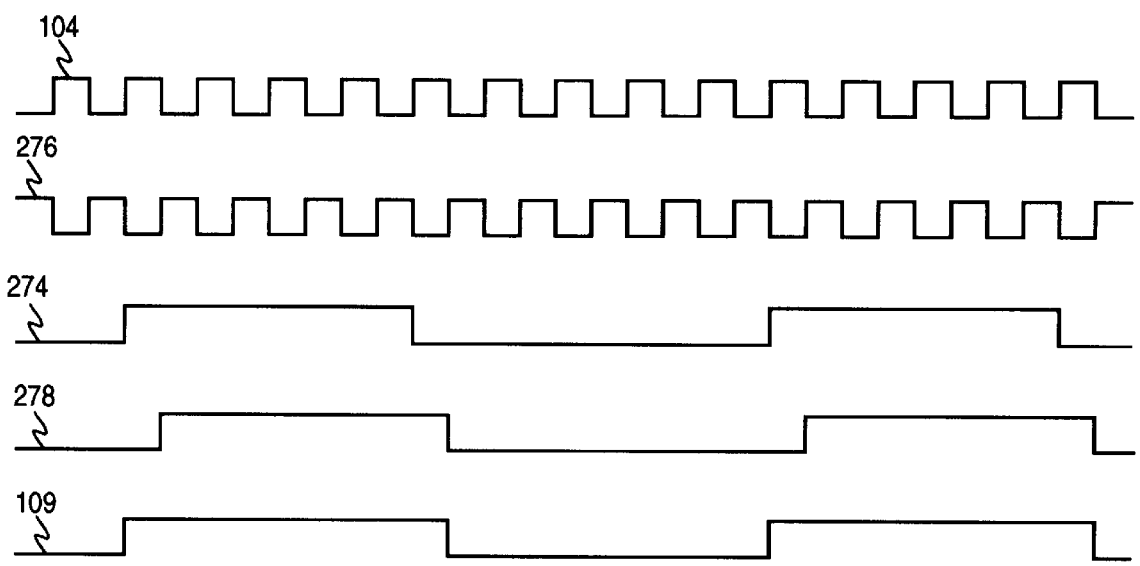

FIG. 7A shows the preferred embodiment of the frequency divide by 9 circuit 108 of FIG. 4, and FIG. 7B shows the resulting waveforms. The frequency divide by 9 circuit 108 comprises a counter 270 clocked by the sampling clock 104 and a flip-flop 272 clocked by the inverse 276 of the sampling clock 104. These circuits are triggered on the rising edge of their respective clocks. The counter 270 counts from zero to eight, and then cycles back to zero; in this manner, bit 2 ($b_2$) 274 is "1" for four consecutive clock cycles and "0" for the next five consecutive clock cycles. Bit 2 ($b_2$) 274 of the counter 270 is connected to the D input of the flip-flop 272, and it is ORed 280 with the output 278 of the flip flop 272 to generate a square wave 109 with a 50% duty cycle which is illustrated by the resulting waveforms shown in FIG. 7B.

The frequency spectrum of a square wave with a 50% duty cycle is a series of harmonics $F_n$, $$F_n = A\mathrm{sinc}\left(\frac{n\pi}{2}\right).$$

Figures 8A, 8B:
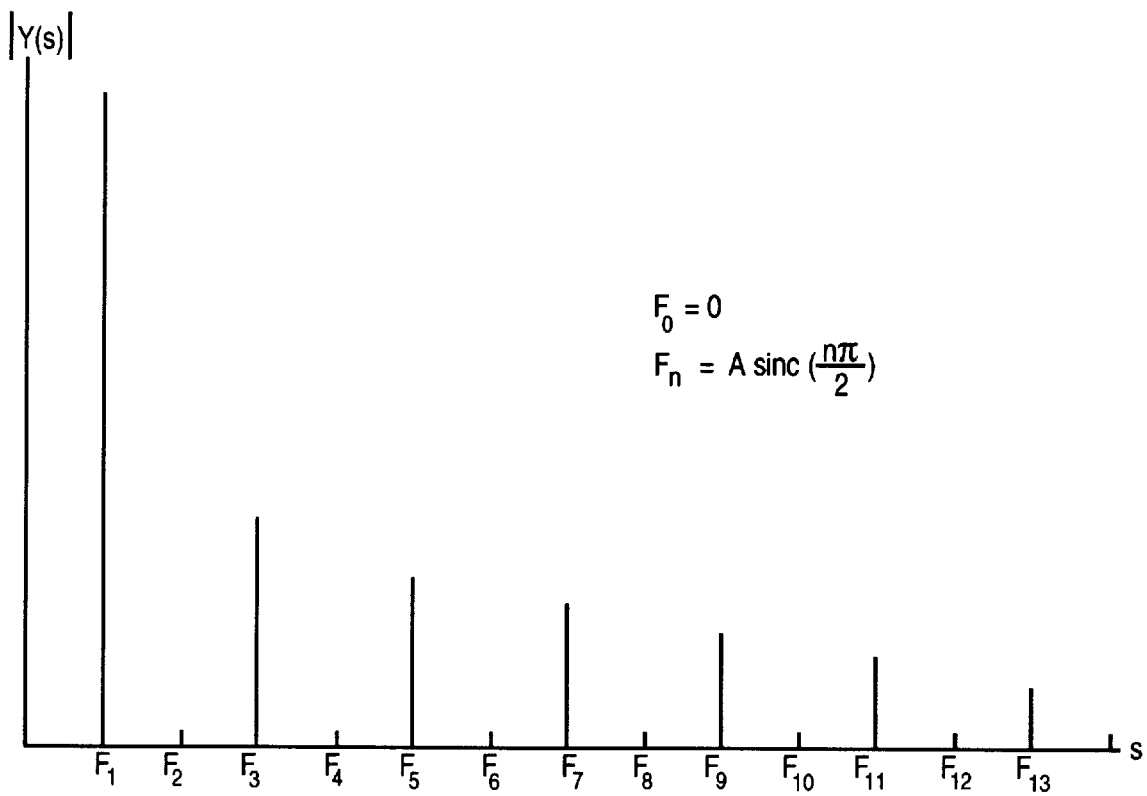
FIG. 8A and 8B show the spectrum (harmonics) of a square wave with a 50% duty cycle and the aliasing that results when oversampling at 9 times the frequency of the square wave.

This spectrum is shown in FIG. 8A and, as can be seen, all of the even numbered harmonics are zero and the odd numbered harmonics decrease in amplitude by approximately a factor of 1/n. Again, this spectrum is inherent in a square wave with a 50% duty cycle, and it accounts for the design choice in the preferred embodiment of the present invention as will now be explained.

A square wave with a 50% duty cycle comprises a tone at the first harmonic and a tone at the third harmonic reduced in amplitude by ⅓ as shown in FIG. 8A. Thus, an accurate power measurement can be taken simultaneously at the first and third harmonics at the output of the analog filter. Ideally, the periodic input signal for calibrating the analog filter should not be perturbed by aliasing so as not to perturb the power measurements. By sampling on the order of the 9th harmonic, the aliasing that results does not significantly perturb the first and third harmonics. This is illustrated in FIG. 8B which shows DC ($F_o$) and the first four harmonics ($F_1$–$F_4$), with the resulting aliased harmonics shown beneath in a table format. As can be seen, the first harmonic ($F_1$) is perturbed by aliasing from harmonics $F_8$, $F_{10}$, $F_{17}$, $F_{19}$, .... However, harmonics $F_8$ and $F_{10}$ are zero and harmonics $F_{17}$ and $F_{19}$ are so small they do not significantly affect the power measurement. A similar result occurs for the third harmonic. The other harmonics of significant magnitude ($F_5$, $F_7$, $F_9$, ...) alias to corresponding even harmonics and can be attenuated via the bandpass filters.

From FIG. 8A and 8B, notice that the bandpass filters for extracting the first and third harmonics should be designed to attenuate all of the harmonics except for the first and third, respectively. Such a filter can be designed in the z-domain as an FIR filter having zeros at $z=e^{j\Theta}$ where $\Theta=2\pi(k/9)$ for k in the set $\{0,2,3,4,-2,-3,-4\}$ to pass the first harmonic, and for k in the set $\{0,1,2,4,-1,-2,-4\}$ to pass the third harmonic. That is, zeros are placed at every harmonic except for the harmonic being passed:

$$H(e^{j\theta}) = \prod_{i=1}^{n} (1 - e^{j\theta_i})$$

where n is the number of zeros and $\Theta\cdot$ takes on the values just described.

Figure 9A:
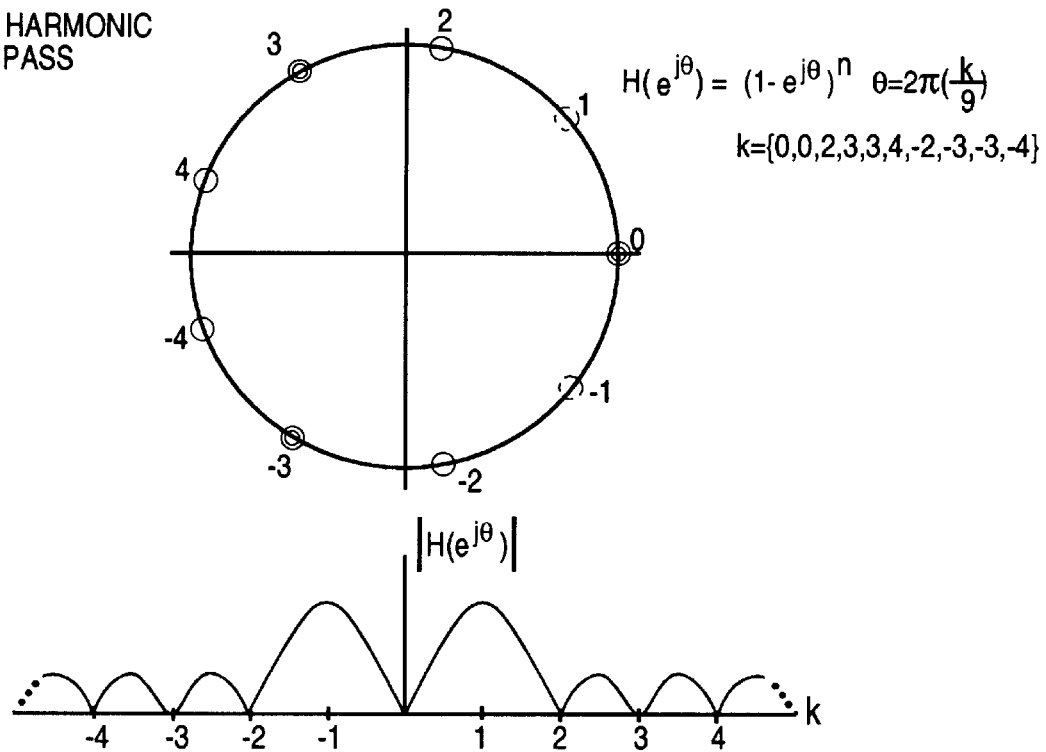
FIG. 9A and 9B show implementation details of the bandpass filters of FIG. 4 for extracting the first and third harmonics of the square wave in the presence of aliasing.
Figure 9B:
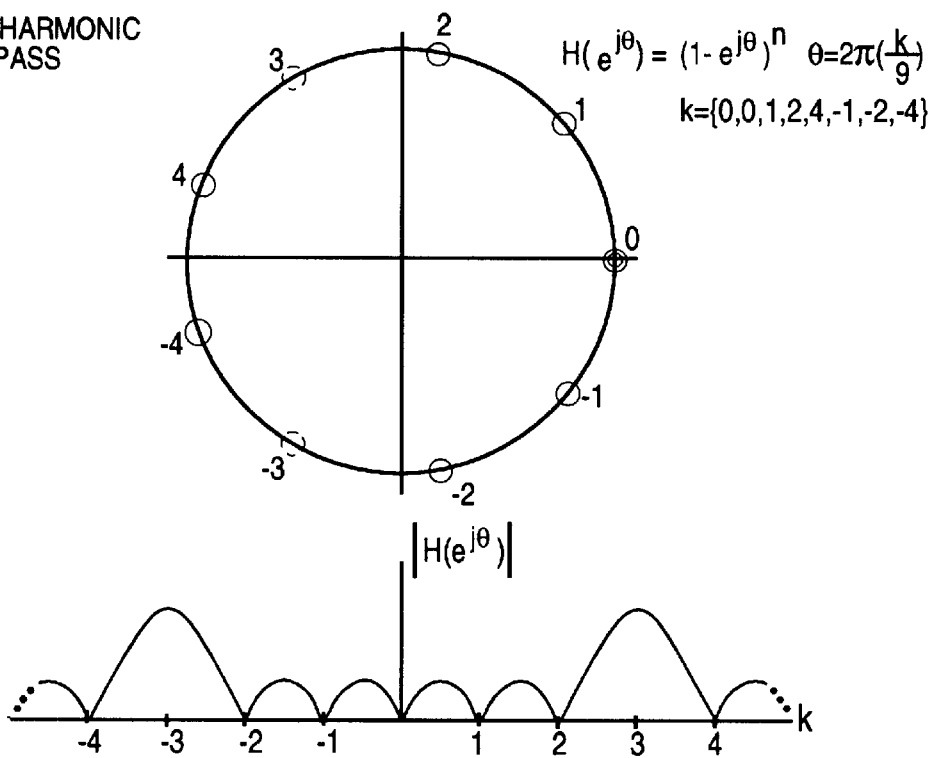

The z-domain plot of the bandpass filters are shown in FIG. 9A and 9B, and beneath each are the respective absolute magnitude responses. As mentioned above, the first bandpass filter 124 of FIG. 4 (for passing the first harmonic) is implemented using the FIR filter in the discrete equalizer filter 26 of the read channel (FIG. 2). Preferably, this FIR filter is implemented using ten taps (i.e., ten coefficients and nine zeros), thus it is possible to place seven zeros in the z-domain at each of the harmonics except the first $\{1,-1\}$ as shown in FIG. 9A. The remaining two zeros are placed at the third harmonic $\{3,-3\}$ to further attenuate its contribution. Also as described above, the channel quality circuit 128 shown in FIG. 5 comprises an additional 1-D filter 140 (i.e., an additional zero at $\Theta=0$) which helps to improve the response of the bandpass filter at the first harmonic. The actual values for the filter coefficients are determined by multiplying out the factored form of the z-domain representation $$\prod_{i=1}^{n} (1 - e^{j\theta_i})$$

where n=10.

The preferred embodiment for the second bandpass filter 126 of FIG. 4 (for passing the third harmonic) is an eight tap (eight coefficients and seven zeros) FIR filter used in interpolated timing recovery. In this manner, no additional FIR filters are needed to implement the calibration technique of the present invention. FIG. 9B shows the z-domain plot for this filter with zeros placed at each of the harmonics except for the third $\{3,-3\}$. Again, an additional zero is placed at $\Theta=0$ due to the 1-D filter 138 of FIG. 5 to assist in shaping the response at the third harmonic. The actual values for the filter coefficients are determined by multiplying out the factored form of the z-domain representation $$\prod_{i=1}^{n} (1 - e^{j\theta_i})$$

where n=8.

Alternative Embodiments

Those skilled in the art will appreciate that various changes could be made to the present invention without departing from the essential function. For example, rather than generate the periodic input signal by dividing the sampling signal and sampling synchronously, an additional frequency synthesizer could be used and the input signal sampled asynchronously. In other words, a first frequency synthesizer could generate the periodic input signal, and a second frequency synthesizer could generate the sampling frequency. In this manner, the frequencies could be selected such that the difference between the two would provide a frequency dither to replace the amplitude dither as described above. This embodiment may be more appropriate if the read channel already comprises a first frequency synthesizer for processing the user data, and a second frequency synthesizer for processing the servo wedges.

Furthermore, in the example provided above the sampling frequency used for calibrating the analog equalizer is the same frequency as that for reading data from the disc during normal operation. This facilitates calibrating the analog equalizer "on line" because the frequency synthesizer need not be re-adjusted between the calibration and normal operating modes. However, this is not a limiting aspect of the present invention; the frequency synthesizer can be configured to any appropriate value as determined by the system designer. Further, the sampling frequency could be related to the periodic input signal by some other multiple (rather than 9); for example, dividing by 7 is an alternative embodiment.

Figure 10:
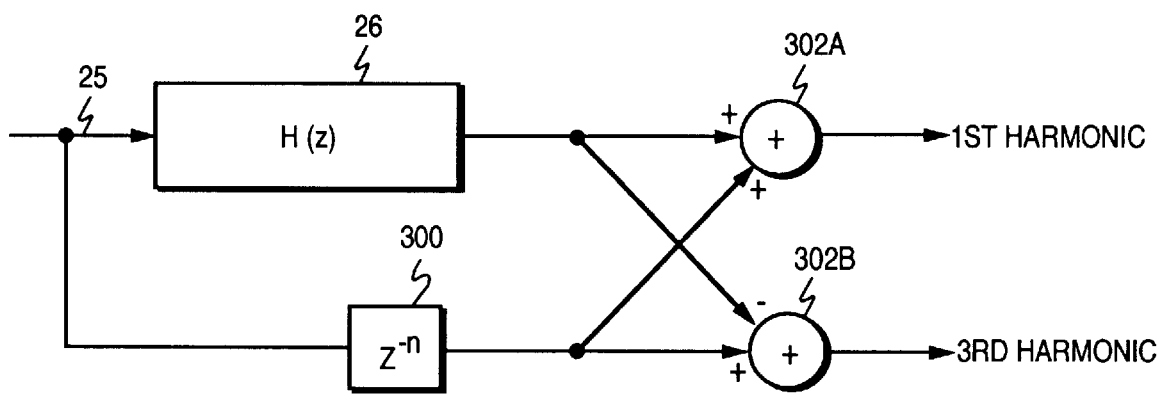
FIG. 10 shows an alternative embodiment for the bandpass filters of FIG. 4.

Other obvious embodiments include changing the form of the discrete time bandpass filters. FIG. 10 shows an alternative embodiment of the bandpass filters for extracting the first and third harmonic. This embodiment uses only one discrete time FIR filter $H(z)$ (such as the equalizer 26 of FIG. 2), a $z^{-n}$ delay 300 to account for additional pipeline delay of $H(z)$, and two adders 302A and 302B for generating the two bandpass filter transfer functions: $z^{-n}+H(z)$ for passing the first harmonic, and $z^{-n}-H(z)$ for passing the third harmonic. The phase response of the FIR filter $H(z)$ is constrained such that $$\angle H\left(e^{j2\pi\left(\frac{3}{9}\right)}\right) = \pi + 2k\pi; \text{ and } \angle H\left(e^{j2\pi\left(\frac{1}{9}\right)}\right) = 21\pi.$$

This creates the desired notch at the third harmonic and boost at the first harmonic for $z^{31\ n}+H(z)$, and it creates the desired notch at the first harmonic and boost at the third harmonic for $z^{-n}-H(z)$. The implementation of the bandpass filters shown in FIG. 10 may be the preferred embodiment if the read channel does not already comprise an additional FIR filter, such as in interpolated timing recovery.

Still other obvious modifications to the present invention would be to measure the frequency response at other harmonics, use different excitation signals, or measure some other aspect of the frequency response. For example, circuitry could be provided to measure a phase response of the analog equalizer at a predetermined frequency rather than measure a magnitude response (power) as described above.

These and other like modifications are within the intended scope of the present invention. The examples provided above are not limiting in the sense that the law allows an interpretation extending to the boundaries of the prior art. The scope of the present invention should, therefore, be determined with respect to the limitations set forth in the claims that follow.

We claim:

1. A method for calibrating an analog filter in a sampled amplitude read channel, comprising the steps of:

(a) injecting a periodic analog signal into an input of the analog filter;

(b) measuring a predetermined spectrum value of the analog filter;

(c) setting a filter parameter value of the analog filter to a value selected from a plurality of values;

(d) repeating steps (b) and (c) at least once; and (e) setting the filter parameter value of the analog filter to an operating value determined from the measured spectrum values of step (b).

2. The calibration method as recited in claim 1, wherein the predetermined spectrum value is a spectrum power value measured at a predetermined frequency.

3. The calibration method as recited in claim 1, wherein:

(a) the analog filter comprises at least one biquad filter comprising an $f_o$ and Q parameter; and (b) the filter parameter value controls a frequency approximate to $f_o$.

4. The calibration method as recited in claim 3, wherein:

(a) the step of measuring a predetermined spectrum value comprises the step of measuring a power value at approximately a desired $f_o$; and (b) the step of setting the operating value comprises the step of selecting the filter parameter value corresponding to a maximum power value at approximately the desired $f_o$.

5. The calibration method as recited in claim 4, wherein:

(a) the periodic analog signal is a square wave comprising a third harmonic; and (b) the step of measuring a power value comprises the step of measuring a power of the third harmonic.

6. The calibration method as recited in claim 5, further comprising the step of setting the Q parameter of the biquad filter to a high value during the measurements.

7. The calibration method as recited in claim 1, wherein:

(a) the analog filter comprises at least one biquad filter comprising an $f_o$ and Q parameter; and (b) the filter parameter value controls the Q parameter.

8. The calibration method as recited in claim 7, wherein:

(a) the periodic analog signal is a square wave comprising a first predetermined harmonic and second predetermined harmonic;

(b) the filter parameter value further controls a frequency approximate to $f_o$;

(c) the step of measuring a predetermined spectrum value comprises the step of measuring a first and second power value at approximately the first predetermined harmonic and the second predetermined harmonic, respectively; and (d) the step of setting the operating value comprises the step of selecting the filter parameter value corresponding to a minimum of a difference between the first and second power values.

9. The calibration method as recited in claim 1, further comprising the step of dithering an amplitude of the periodic analog signal to compensate for quantization noise.

10. The calibration method as recited in claim 1, further comprising the steps of:

sampling the periodic input signal to generate a sequence of discrete time sample values; and filtering the sample values with a discrete time FIR filter before performing the measurement in step (b).

11. The calibration method as recited in claim 10, further comprising the steps of:

frequency dividing a sampling clock to generate the periodic input signal; and sampling the periodic input signal using the sampling clock.

12. The calibration method as recited in claim 11, wherein:

(a) the periodic input signal is a square wave; and (b) the step of frequency dividing divides the sampling clock by 9.

13. A calibration circuit for calibrating an analog filter in a sampled amplitude read channel, comprising:

(a) a signal generator for generating a periodic analog signal input into the analog filter;

(b) a measuring circuit for measuring a predetermined spectrum value of the analog filter at a predetermined frequency; and (c) a controller for setting a filter parameter value of the analog filter to a value selected from a plurality of values and for setting the filter parameter value to an operating value determined from the measured spectrum values.

14. The calibration circuit as recited in claim 13, wherein the predetermined spectrum value is a spectrum power value measured at a predetermined frequency.

15. The calibration circuit as recited in claim 13, wherein:

(a) the analog filter comprises at least one biquad filter comprising an $f_o$ and Q parameter; and (b) the filter parameter value controls a frequency approximate to $f_o$.

16. The calibration circuit as recited in claim 15, wherein:

(a) the measuring circuit measures a power value at approximately $f_o$; and (b) the controller for setting the operating value comprises a comparator for selecting the filter parameter value corresponding to a maximum power value at approximately $f_o$.

17. The calibration circuit as recited in claim 16, wherein:

(a) the periodic analog signal is a square wave comprising a third harmonic; and (b) the measuring circuit measures a power of the third harmonic.

18. The calibration circuit as recited in claim 17, wherein the controller sets the Q parameter of the biquad filter to a high value.

19. The calibration circuit as recited in claim 13, wherein:

(a) the analog filter comprises at least one biquad filter; and (b) the filter parameter value controls the Q parameter.

20. The calibration circuit as recited in claim 19, wherein:

(a) the periodic analog signal is a square wave comprising a first predetermined harmonic and second predetermined harmonic;

(b) the filter parameter further comprises a frequency approximate to $f_o$;

(c) the measuring circuit measures a first and second power value at approximately the first predetermined harmonic and the second predetermined harmonic, respectively; and (d) the controller for setting the operating value selects the filter parameter value corresponding to a minimum of a difference between the first and second power values.

21. The calibration circuit as recited in claim 20, further comprising a first and second bandpass filter for extracting the first predetermined harmonic and the second predetermined harmonic, respectively, from the analog signal.

22. The calibration circuit as recited in claim 21, wherein the first bandpass filter is an FIR equalizer filter and the second bandpass filter is an FIR interpolated timing recovery filter.

23. The calibration circuit as recited in claim 13, further comprising a dithering circuit for dithering an amplitude of the periodic analog signal to compensate for quantization noise.

24. The calibration circuit as recited in claim 13, further comprising:

(a) a sampling circuit for sampling the periodic input signal to generate a sequence of discrete time sample values; and (b) a discrete time FIR filter for filtering the sample values before the measuring circuit measures the predetermined spectrum value.

25. A calibration circuit for calibrating an analog filter in a sampled amplitude read channel, comprising:

(a) a signal generator for generating a periodic analog signal input into the analog filter;

(b) a controller for selecting one of N biquad filters in the analog filter for receiving the periodic analog signal, where N is an integer greater than one; and (c) a measuring circuit for measuring a predetermined spectrum value at a predetermined frequency of the selected biquad filter;

wherein:

the controller sets a filter parameter value of the selected biquad filter to a value selected from a range of values; and the controller sets the filter parameter value to an operating value determined from the measured spectrum values.

* * * * *